US008657160B2

(12) United States Patent
Lashells et al.

(10) Patent No.: US 8,657,160 B2
(45) Date of Patent: Feb. 25, 2014

(54) PUMP BOTTLE ADAPTER

(75) Inventors: Paul Lashells, Cincinnati, OH (US); Jeff Fiessinger, Troy, OH (US)

(73) Assignee: Better Science, LLC, Cincinnati, OH (US)

( * ) Notice: Subject to any disclaimer, the term of this patent is extended or adjusted under 35 U.S.C. 154(b) by 326 days.

(21) Appl. No.: 12/906,631

(22) Filed: Oct. 18, 2010

(65) Prior Publication Data

US 2012/0091169 A1 Apr. 19, 2012

(51) Int. Cl.
*B65D 88/54* (2006.01)
*G01F 11/00* (2006.01)

(52) U.S. Cl.
USPC ................. 222/309; 222/153.03; 222/153.04; 222/153.13; 222/402.11

(58) Field of Classification Search
USPC ................. 222/309, 250, 73, 14, 15, 17, 384, 222/153.01, 319, 320, 321.1, 321.7–321.9, 222/372, 383.1, 383.3, 385
See application file for complete search history.

(56) References Cited

U.S. PATENT DOCUMENTS

| | | | | |
|---|---|---|---|---|
| 3,848,778 | A * | 11/1974 | Meshberg | 222/402.11 |
| 5,582,598 | A * | 12/1996 | Chanoch | 604/208 |
| 7,784,650 | B2 * | 8/2010 | Bates et al. | 222/402.13 |
| 8,056,764 | B2 * | 11/2011 | Paasch et al. | 222/146.5 |
| 2005/0072808 | A1 * | 4/2005 | Kitamura | 222/309 |
| 2009/0200341 | A1 * | 8/2009 | Oden et al. | 222/309 |
| 2010/0181343 | A1 * | 7/2010 | Crossdale et al. | 222/309 |

* cited by examiner

*Primary Examiner* — Paul R Durand
*Assistant Examiner* — Jeremy W Carroll
(74) *Attorney, Agent, or Firm* — Ulmer & Berne LLP

(57) ABSTRACT

Fluid dispensers can be provided with a pump bottle that can have a fluid retaining portion, a pump neck that can be engaged with the fluid retaining portion such that the pump neck can be fluid communication with the fluid retaining portion, and a pump head that can be associated with the top portion of the pump neck, where the pump head can be configured to dispense a fluid retained in the fluid retaining portion of the pump bottle. The fluid dispenser can have an adapter ring that can be engaged with the pump neck, where the adapter ring can be selectively movable along a vertical length of the pump neck. The fluid dispenser can have a lock member, where the locking member can be associated with the adapter ring and the locking member can have a first unlocked position and a second locked position.

10 Claims, 14 Drawing Sheets

PUMP BOTTLE ADAPTER

FIELD

Embodiments of the present invention relate, in general, to adapters for pump bottles and, more particularly, to adapters used to control the travel of the pump neck of the pump bottle.

BACKGROUND

Pump bottles can be found in a variety of places in a variety of fields. For example, pump bottles may be used to dispense a fluid such as liquid soap, antiseptic, or any other fluid.

Traditional pump bottles require placing a hand or other receptacle underneath the dispensing mouth of the pump bottle and pressing downward on the head of the pump bottle to dispense a fluid into the hand or receptacle.

However, different users may have different needs with respect to the amount of fluid needed. With traditional pump bottles, the user may attempt to partially press down the head of the pump bottle to dispense a desired amount, which results in an imprecise delivery. In applications where a precise amount of fluid is desirable such a delivery system may be ineffective and could potentially cause damage if an improper quantity of fluid is provided for a specific application.

BRIEF DESCRIPTION OF THE DRAWINGS

The accompanying drawings incorporated in and forming a part of the specification illustrate several aspects of the present invention, and together with the description serve to explain the principles of the invention; it being understood, however, that this invention is not limited to the precise arrangements shown. In the drawings, like reference numerals refer to like elements in the several views. In the drawings.

DETAILED DESCRIPTION

The present disclosure is directed generally toward a pump bottle adapter for use with a pump bottle. In general, the pump bottle adapter may be placed on a pump neck of a pump bottle or on any suitable dispensing apparatus. The pump bottle adapter may be associated with existing pump dispensers, or the like, or may be configured for use with a pump dispenser configured for use with an adapter having a particular design and/or configuration. Once placed on the pump neck, in one version, the pump bottle adapter may be fixedly or detachably locked into place. Once the adapter is positioned on the dispenser, the vertical travel of the pump neck may be limited by the position of the adapter relative to the bottle collar or other stop member. Because the amount of fluid dispensed from a pump bottle is generally proportionate to the distance the pump neck travels while dispensing a product, by positioning the adapter on the pump neck and limiting the travel of the pump neck, a specific amount of fluid can be delivered more accurately.

In one version, if the user wishes to dispense an amount different from the initial setting of the adapter relative to the collar or stop on the bottle, the pump bottle adapter may be removed, unlocked, or adjusted, which then frees the pump bottle adapter to move up and down freely along the pump neck. Upon selecting an appropriate position on the pump neck for the pump bottle adapter, the user can lock the pump bottle adapter into place, which corresponds to a different amount of fluid to be dispensed. To aid the user in determining the right position to lock the pump bottle adapter, the pump neck may comprise a series of markings along the pump neck.

The markings may be used as reference points for locking the pump bottle adapter into place. Marks on the neck may be tactile and/or visual markings such as, for example, written markings, measurements, annular grooves corresponding to a flange on the adapter, and/or any other suitable indicator.

In some other versions, the pump neck of the pump bottle may be modified in addition to using the pump bottle adapter to control the distance that the pump neck can move in the downward direction. For example, portions of the pump neck may be modified to engage and interact with the pump bottle adapter to prevent the pump neck from moving lower than a certain point when the user presses down on the pump head.

I. Pump Bottle Adapters

Figure 1:
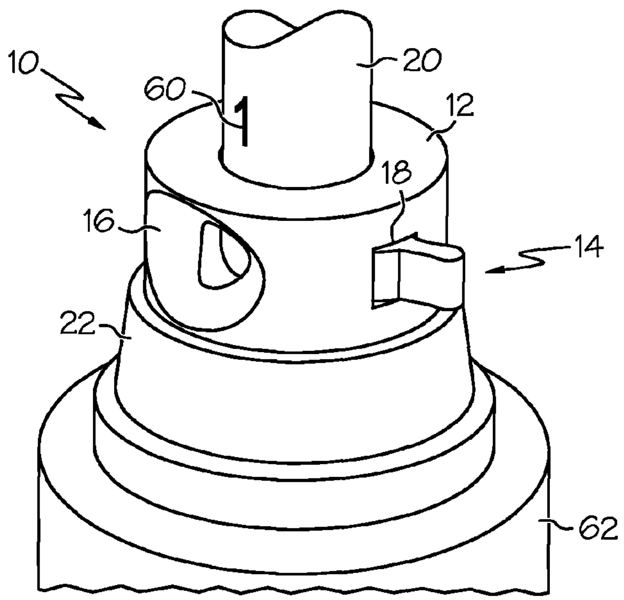
FIG. 1 depicts a perspective view of one version of a pump bottle adapter.
Figure 2A:
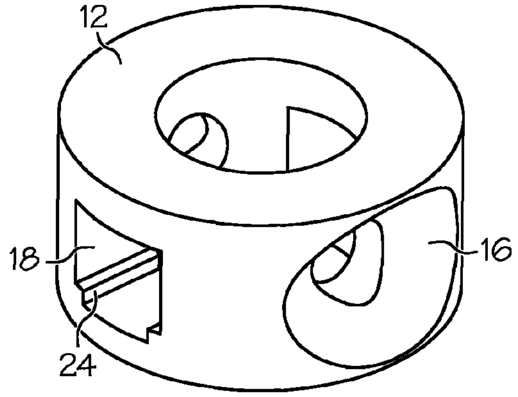
FIGS. 2A-B depicts a perspective view of one version of an adapter ring of the pump bottle adapter of FIG. 1.
Figure 2B:
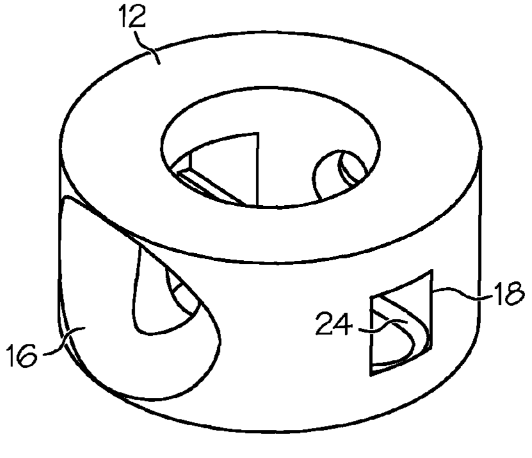

Turning now to the figures, FIG. 1 depicts one exemplary version of a pump bottle adapter (10) positioned around the circumference of a pump neck (20) of a pump bottle (62). Pump bottle adapter (10) comprises an adapter ring (12) and a locking member (14).

As seen in FIGS. 2-5, adapter ring (12) comprises a generally cylindrical shape having a cylindrically shaped opening extending through the center of the adapter ring (12). Adapter ring (12) comprises generally smooth and uniform surfaces about the exterior of adapter ring (12). The opening extending through adapter ring (12) is shaped to accept a pump neck (20), the pump neck (20) having a central axis (FIG. 5A). However, any suitable shape for adapter ring (12) may be used as will be apparent to one of ordinary skill in the art in view of the teachings herein including, for example, adapter rings configured to fit a wide variety of pump necks, adapters designed for use with a specific pump neck, adapters having any suitably shaped aperture to accept a pump neck. Adapter ring (12) comprises an adapter opening (16) which in one version extends laterally through the side wall of adapter ring (12) from one end of adapter ring (12) to the other. Adapter opening (16) comprises a beveled rim such that the radius of the opening is larger on the exterior of adapter opening (16) than the radius of the opening on the interior of adapter opening (16). As a result, adapter opening (16) gradually becomes larger in going from the interior to the exterior of adapter ring (12). In versions of the adapter ring (12) having an adapter opening (16), the adapter opening (16) may be used to allow a user to visualize markings, such as fluid measurement markings, on the pump neck (20). It will be appreciated that the adapter opening (16) is described by way of example only, where any suitable visualization member may be associated with the adapter ring (12) and/or pump neck (20).

In the illustrated version, adapter ring (12) further comprises a rectangular slot (18) extending through the side wall of adapter ring (12) which severs as a seat for a locking member (14). Rectangular slot (18) further comprises a notched portion (24). Notched portion (24) extends through the length of rectangular slot (18). In the illustrated version, rectangular slot (18) is graduated such that as rectangular slot (18) extends from one end of adapter ring (12) to the other, where one end of rectangular slot (18) is larger than the other end. Rectangular slot (18) and adapter opening (16) are positioned such that the paths that they define intersect generally perpendicularly. Positioned within rectangular slot (18) is a locking member (14). Rectangular slot (18) gradually increases in size from one end of rectangular slot (18) to the other, where in the illustrated version the larger end of rectangular slot (18) is sized such that locking member (14) may be inserted into rectangular slot (18) prior to placing adapter ring (12) on pump neck (20). Locking member (14) has a height sufficient to fill the space of rectangular slot (18).

Figure 3B:
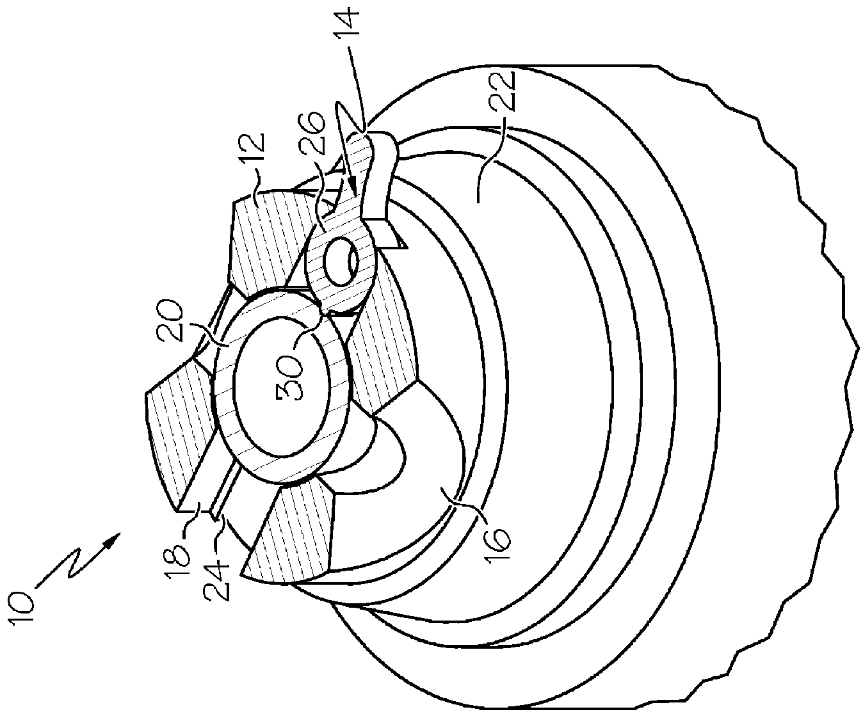
FIGS. 3A-B depicts a cross-sectional perspective view of the pump bottle adapter of FIG. 1.
Figure 3A:
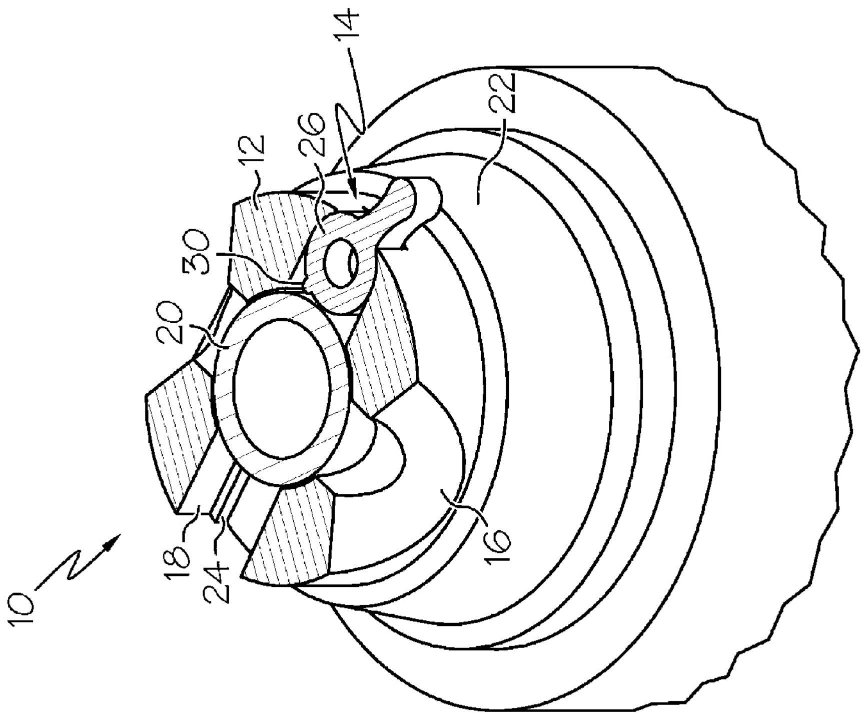
Figure 4A:
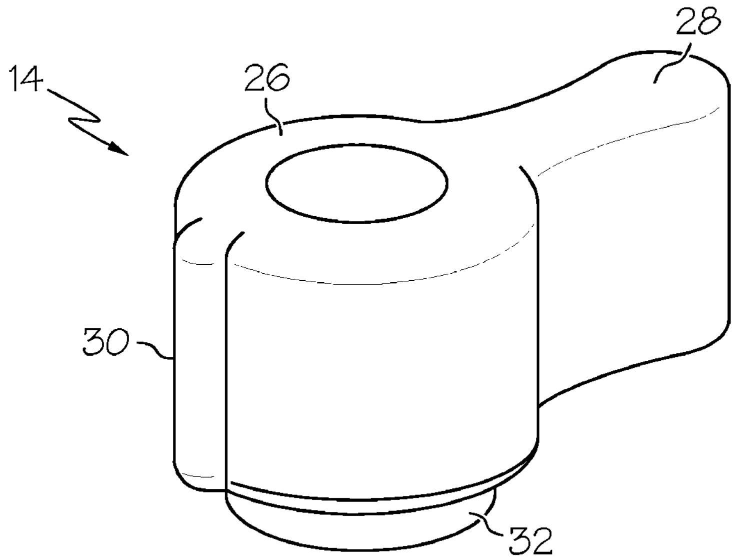
FIG. 4A depicts a perspective view of a locking member of the pump bottle adapter of FIG. 1.
Figure 4B:
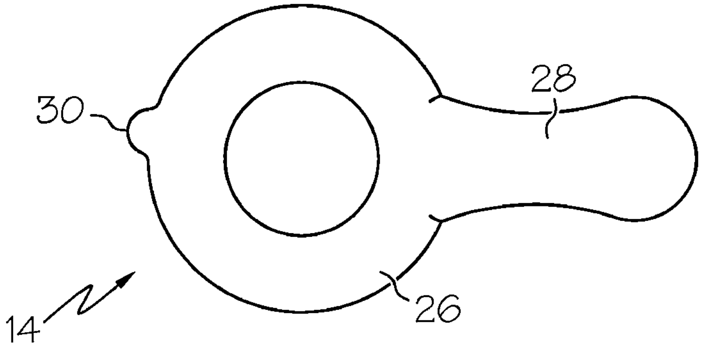
FIG. 4B depicts a top view of the locking member of FIG. 4A.
Figure 5A:
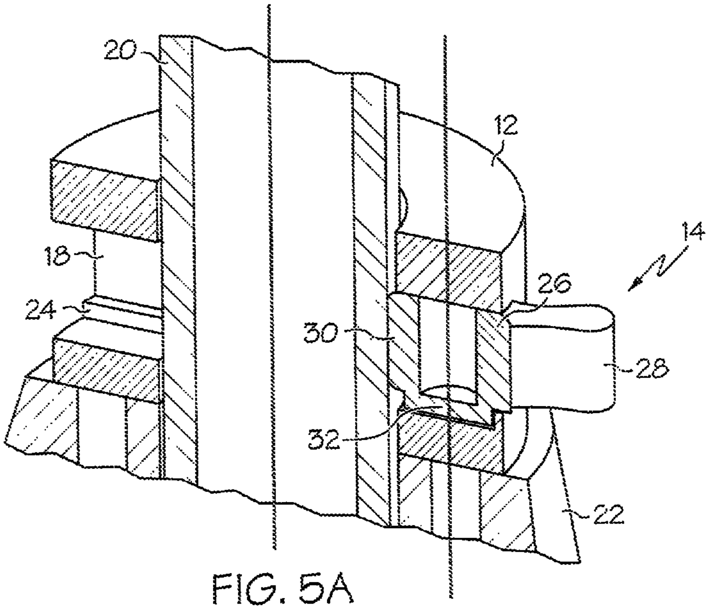
FIG. 5A depicts another cross sectional perspective view of the pump bottle adapter of FIG. 1.
Figure 5B:
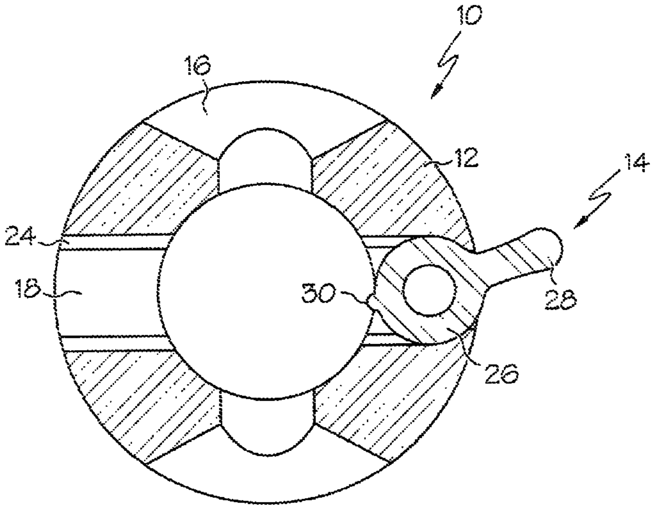
FIG. 5B depicts a cross sectional top down view of the pump bottle adapter of FIG. 1.

The illustrated version, locking member (14) comprises a pivot portion (26), the pivot portion (26) having a central axis (FIG. 5A), and a handle (28) attached to pivot portion (26). Handle (28) comprises a generally elongated member able to be manipulated by the thumb or finger of a user. Handle (28) further comprises a rounded end and is positioned to extend outwardly from rectangular slot (18) such that handle (28) may be engaged by a user. Pivot portion (26) comprises a generally cylindrical annulus dimensioned to fit within rectangular slot (18). Protruding from pivot portion (26) is a tab (30). The illustrated version shows tab (30) positioned opposite from handle (28) on pivot portion (26). Locking member (14) further comprises a notched bottom (32). Notched bottom (32) is shaped to complement notched portion (24) of rectangular slot (18). Pivot portion (26) is sized to fit within rectangular slot (18). A portion of rectangular slot (18) may be shaped to slightly follow the curve of pivot portion (26) such that rectangular slot (18) may be used to retain or hold pivot portion (26) without pivot portion falling out of rectangular slot (18). Locking member (14), when positioned in rectangular slot (18), has two positions: a locked position and an unlocked position. For example, FIG. 3A depicts locking member (14) in a locked position whereas FIG. 3B depicts locking member (14) in an unlocked position. Locking member (14) may be moved from the locked position to the unlocked position and vice versa by a user manipulating handle (28). While in the locked position, tab (30) protrudes slightly into the opening extending through the center of adapter ring (12). While in the unlocked position, tab (30) does not protrude into the opening extending through the center of adapter ring (12). It will be appreciated that the locking member (14) is described by way of example only, where any suitable locking components may be associated with the ring adapter (12) and/or the pump neck (20).

Pump bottle adapter (10) is able to move up and down pump neck (20) to a suitable position while locking member (14) is in an unlocked position. Pump neck (20) may comprise at least one marking (60). Marking (60) may comprise, for example, a number, letter, and/or any other suitable shape or figure. Marking (60) may be surface ornamentation and/or a tactile indicator such as a surface change on the pump neck (20). By looking through adapter opening (16) as pump bottle adapter (10) is moved up and/or down pump neck (20), the user may determine whether adapter ring (12) is properly in position by lining adapter opening (16) with an appropriate marking (60) to position adapter ring (12). Upon determining that pump bottle adapter (10) is at an appropriate position on pump neck (20), locking member (14) may be switched to the locked position. Once in the locked position, pump bottle adapter (10) can no longer move up and down. When the user then attempts to press down the head of pump bottle (62), adapter ring (12) acts as a stop to prevent further movement of the head of pump bottle (62) once adapter ring (12) contacts bottle collar (22). Generally speaking, as pump bottle adapter (10) is positioned higher on pump neck (20), the head of pump bottle (62) may be pressed down further, which may result in more fluid being dispensed from pump bottle (62). As pump bottle adapter (10) is positioned lower on pump neck (20), the travel of the pump is limited, which results in a lesser amount of fluid being dispensed from pump bottle (62). The user need not necessarily use marking (60) to determine whether adapter ring (12) is properly positioned, where in applications where imprecise measurements are needed a user may simply position the adapter ring (12) along an unmarked pump neck (20) as appropriate. Marking (60) may further comprise a textured or raised surface such that as the user slides pump bottle adapter (10) along pump neck (20), marking (60) provides tactile feedback for the user such that the user is able to feel whether adapter ring (12) is in an appropriate position. In one version, the adapter ring (12) may be placed at the very base of pump neck (20) where, for example, a user wants to prevent a pump from being able to dispense any fluid. Such an application may be particularly useful in homes with small children, where the adapter ring (12) functions as a safety device on bottles containing harmful chemicals.

Generally, pump bottle adapter (10) may be placed onto pump neck (20) prior to attaching the head to pump neck (20). The head may then be attached to pump neck (20) to prepare pump bottle (62) for use. Pump bottle adapter (10) may be sized to fit any standard sized pump neck (20) such that pump bottle adapter (10) may be used with pump bottles having different shapes and sizes. For example, a user may purchase a pump bottle from a different manufacturer and install pump bottle adapter (10) onto the purchased pump bottle for use. Other suitable variations of applying pump bottle adapter (10) to pump neck (20) may be used as would be apparent to one of ordinary skill in the art in view of the teachings herein.

Figure 6:
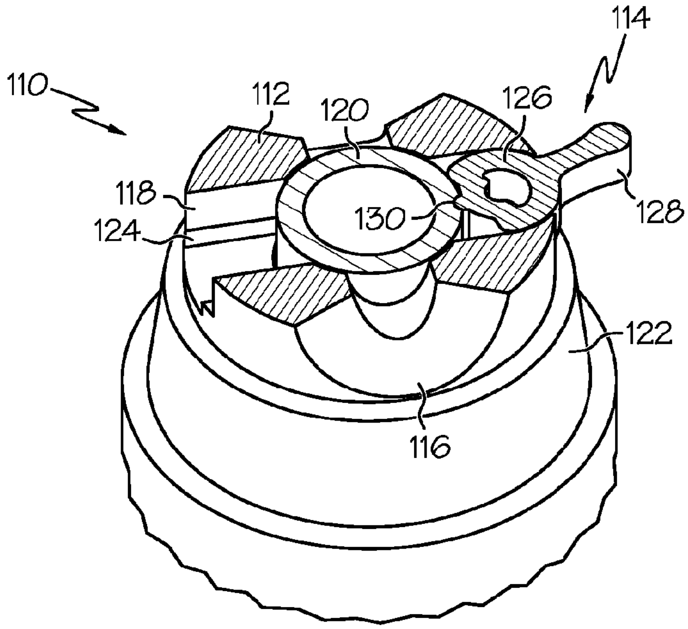
FIG. 6 depicts a cross sectional perspective view of an alternative version of a pump bottle adapter.
Figure 7A:
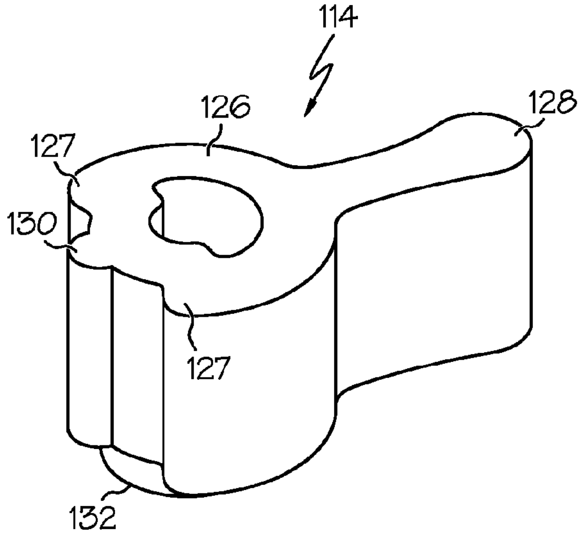
FIG. 7A depicts a perspective view of a locking member of the pump bottle adapter of FIG. 6.
Figure 7B:
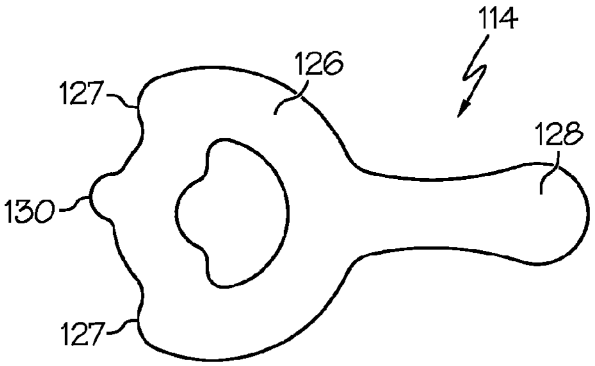
FIG. 7B depicts a top down view of a locking member of the pump bottle adapter of FIG. 6.

FIGS. 6-7 depict an alternative version of a pump bottle adapter (110) comprising an adapter ring (112) and a locking lever (114), where locking lever (114) comprises a modified pivot portion (126). Pump bottle adapter (110) may be placed on pump neck (120) by, for example, sliding the adapter (110) over the pump neck (120) such that the adapter (110) and pump neck (120) are coaxial. Adapter ring (112) comprises an adapter opening (116) and a rectangular slot (118) where both adapter opening (116) and rectangular slot (118) extend through adapter ring (112) and define paths that intersect approximately perpendicularly.

Locking lever (114) comprises a handle (128) and pivot portion (126). Pivot portion (126) comprises a protruding tab (130) attached to pivot portion (126). In the illustrated version, pivot portion (126) further comprises a pair of opposing tabs (127) which are positioned on opposite sides of pivot portion (126). In the illustrated version, pair of opposing tabs (127) are positioned to flank protruding tab (130) with protruding tab (130) slightly off center from the center point between pair of opposing tabs (127). Pair of opposing tabs (127) protrude generally in the direction of protruding tab (130). As the user manipulates locking lever (114) from an open position to a closed position, each of pair of opposing tabs (127) may be positioned to prevent locking lever (114) from moving beyond a certain point. Thus pair of opposing tabs (127) act as stops for when locking lever (114) is manipulated from left to right by the user. Any suitable locking lever (114), lock, stop, or the like may be associated with adapters described herein depending on the purpose and/or design of the pump bottle. Locking members may use a friction fit, projections, keyed channels, and/or any other suitable elements to secure an adapter to a pump neck or pump bottle. In one version, the pump neck may be configured such that the locking member may only be placed in a locked configuration at certain pre-determined locations, such as with indentations in a pump neck corresponding to the locking member.

Figure 8A:
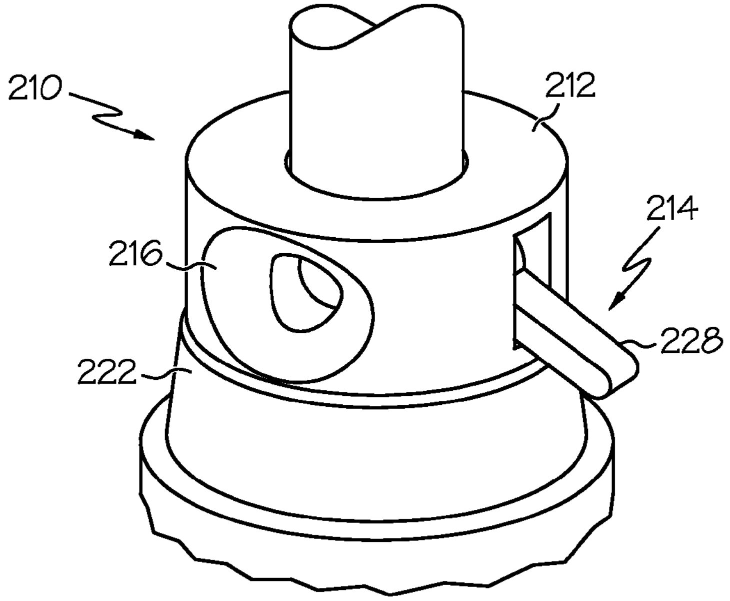
FIG. 8A depicts a perspective view of an alternative version of a pump bottle adapter.
Figure 8B:
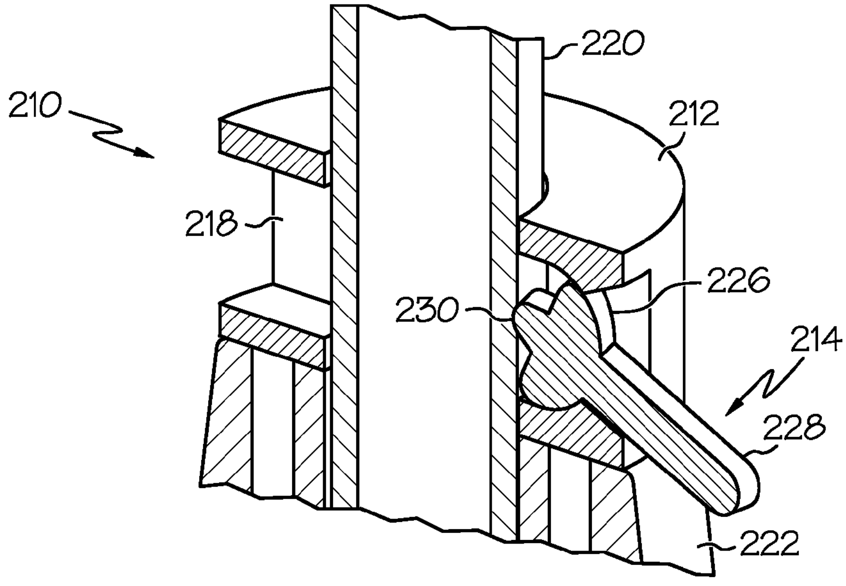
FIGS. 8B-D depict cross sectional views of the pump bottle adapter of FIG. 8A.
Figure 8C:
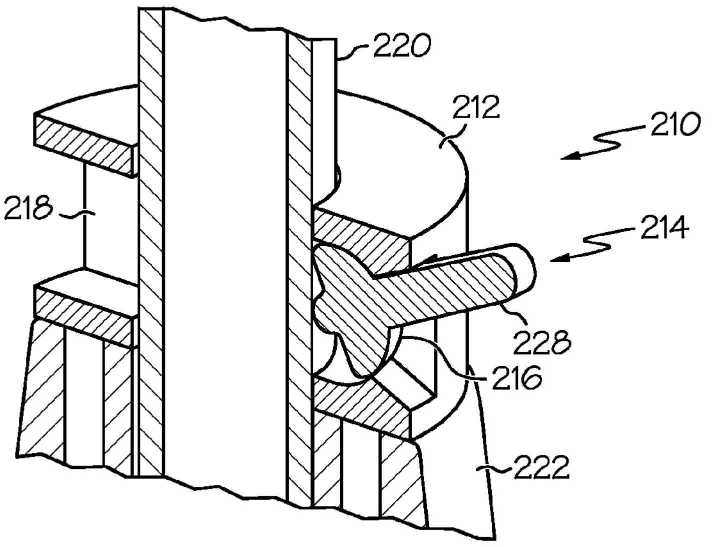
Figure 8D:
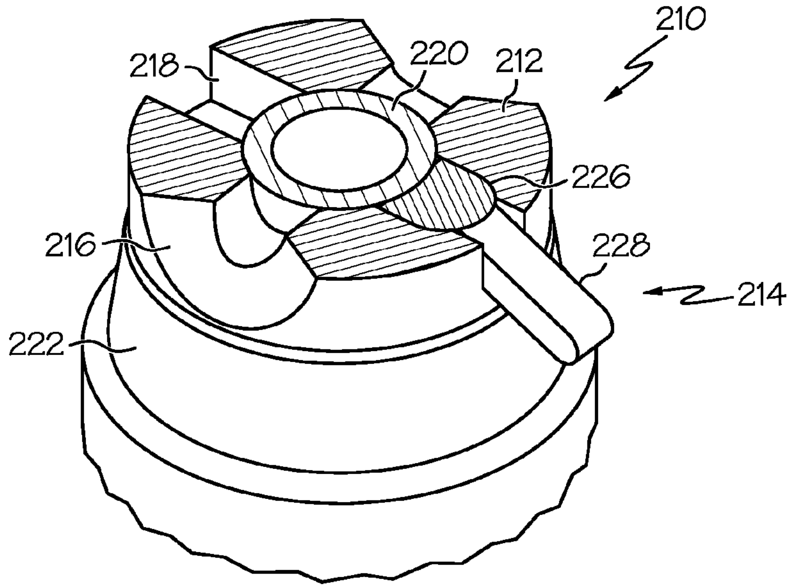
Figure 9A:
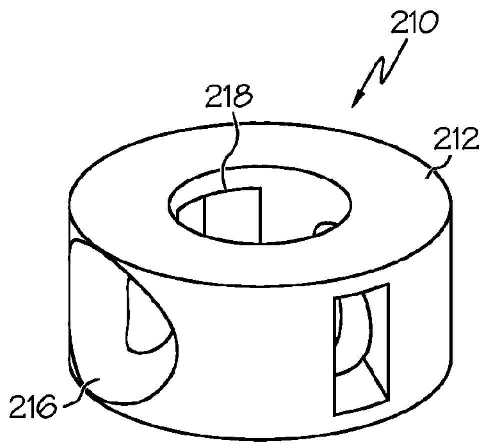
FIG. 9A depicts a perspective view of an adapter ring of the pump bottle adapter of FIG. 8A.
Figure 9B:
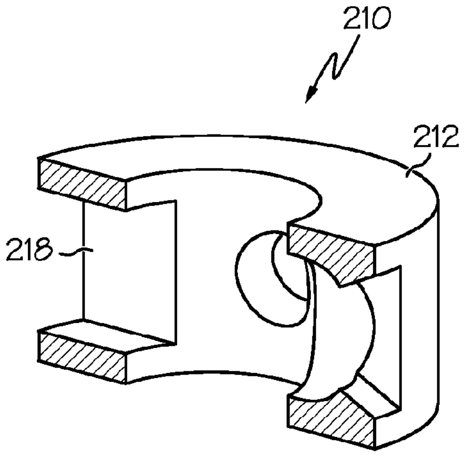
FIG. 9B depicts a cross sectional perspective view of the adapter ring of FIG. 9A.
Figure 10A:
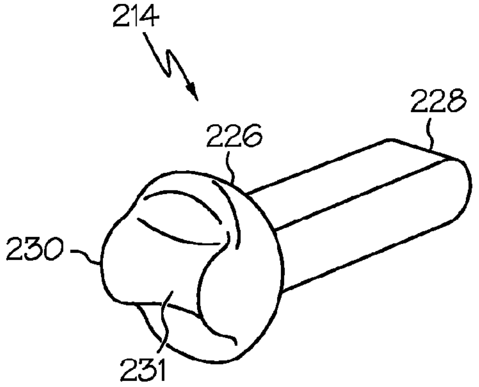
FIG. 10A depicts a perspective view of a locking member of the pump bottle adapter of FIG. 8A.
Figure 10B:
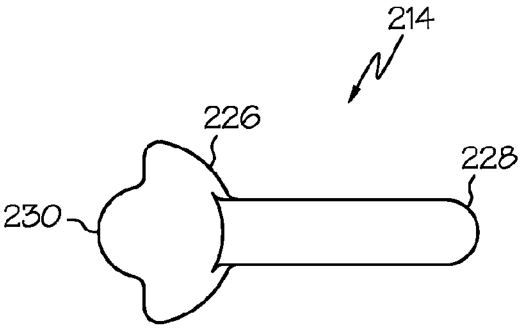
FIG. 10B depicts a top down view of the locking member of FIG. 10A.

FIGS. 8-10 depict an alternative version of pump bottle adapter (210) comprising an adapter ring (212) and a locking lever (214), where locking lever (214) comprises a modified pivot portion (226). Pump bottle adapter (210) is placed on pump neck (220). Adapter ring (212) comprises an adapter opening (216) and a modified rectangular slot (218) where both adapter opening (216) and rectangular slot (218) extend through adapter ring (212) and define paths that intersect at approximately perpendicularly.

Rectangular slot (218) is oriented vertically such that locking lever (214), as shown in FIG. 8C, may move up and down within rectangular slot (218). Rectangular slot (218) comprises an opening that flares outward to match the contour of locking lever (214). Rectangular slot (218) comprises a semi-circular pocket as shown in FIGS. 8B-8C for fitting pivot portion (226). It will be appreciated that the configuration of rectangular slot (218) is shown by way of example only and other retention or seat configurations of the adapter for a variety of locking members are contemplated.

Locking lever (214) comprises a handle (228) and pivot portion (226). Pivot portion (226) comprises a protruding tab (230) attached to pivot portion (226). Pivot portion (226) comprises a generally semi-circular shape and protruding tab (230) comprises a generally semi-circular shape extending outward from pivot portion (226). Pivot portion (226) further comprises a small horizontal tab (231) extending outward from pivot portion (226). Horizontal tab (231) is shaped such that when locking lever (214) is in a locked position, horizontal tab (231) impedes the movement of adapter ring (212) along pump neck (220). Conversely, when locking lever (214) is in an unlocked position, horizontal tab (231) does not impede movement of adapter ring (212) along pump neck (220). Rather than manipulating locking lever (214) from side to side to move locking lever from an unlocked to a locked position, locking lever (214) may be moved up and down to shift locking lever (214) from an unlocked position to a locked position. For example, locking lever (214) in the up position may result in locking lever (214) to be in a locked position whereas locking lever (214) in the down position may result in locking lever (214) to be in an unlocked position. However, any suitable configuration for locking lever (214) may be used.

It will be appreciated that other locking members and adapters are contemplated. For example, the adapter may have any suitable geometric shape, such as a quadrilateral or semicircular configuration, depending on the needs of the applications. Various locking members may be utilized having, for example, threaded components such as a screw that may be threaded perpendicular to the pump neck to create a friction fit to secure the adapter at a position on the pump neck. Any suitable mechanical locking member is contemplated. In one version, the locking member may be configured such that upon locking the adapter about the pump neck the user is unable to disengage the lock such that the adapter remains fixed to the pump neck at a particular location.

II. Modified Pump Bottle

Figure 11:
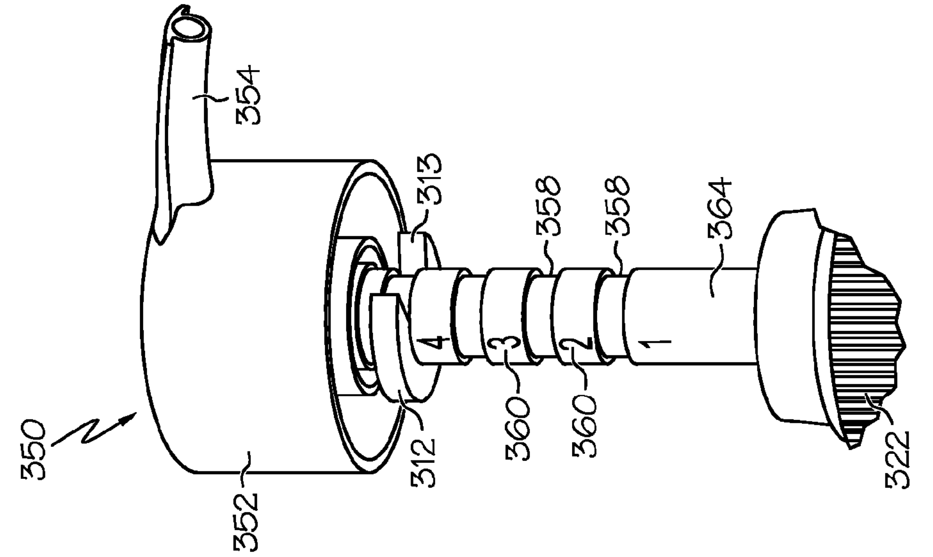
FIG. 11 depicts a perspective view of an alternative version of a pump bottle adapter with a modified pump bottle.
Figure 12A:
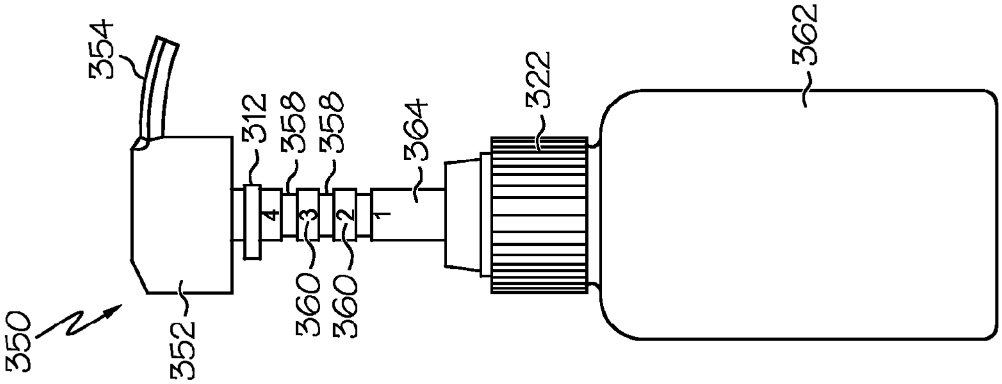
FIG. 12A depicts a side view of the pump bottle adapter and the pump bottle of FIG. 11.
Figure 12B:
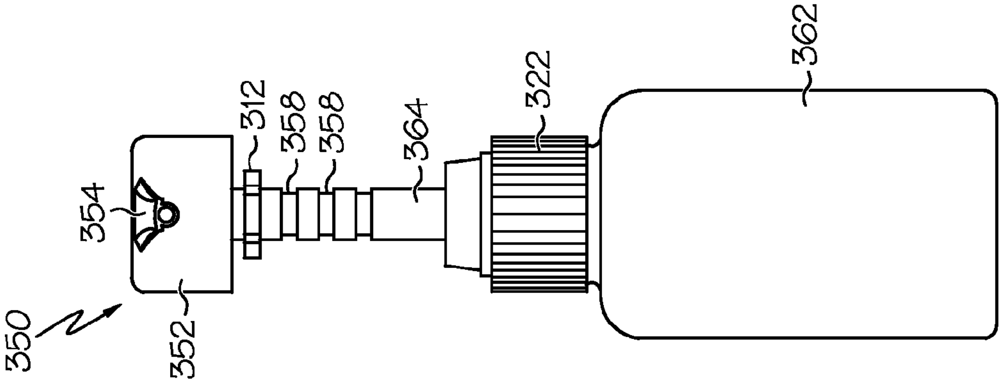
FIG. 12B depicts a front view of the pump bottle adapter and the pump bottle of FIG. 11.

FIGS. 11-12 depict a version of a modified pump bottle (350) having a pump head (352), modified pump neck (364), and an adapter ring (312). Pump head (352) comprises a standard shaped pump head (352) for use with pump bottle (350) operable for a user to press downward to dispense a fluid contained in a bottle portion (362). Pump head (352) comprises a dispensing spout (354) for dispensing a fluid contained in bottle portion (362). Dispensing spout (354) comprises an elongated spout shape, but any suitable means and/or mechanism for dispensing fluid may be used as would be apparent to one of ordinary skill in the art in view of the teachings herein. Providing a pump neck having configurations as illustrated herein may provide an alternative means for regulating the amount of fluid dispensed from a bottle. In one version, an existing pump bottle may be used by removing a standard pump neck and inserting a modified pump neck having gradation control into the existing pump bottle.

In the illustrated version, the modified pump neck (364) connects a pump head (352) to a bottle collar (322), where bottle collar (322) attaches to bottle portion (362). Modified pump neck (364) has a generally cylindrical shape and further comprises at least one indented ring (358) or annular channel and at least one marking (360). At least one indented ring (358) or annular channel is positioned in the illustrated version to encircle the circumference of the modified pump neck (364) however, a partial horizontal channel or other suitable configuration is contemplated. The at least one indented ring (358) may be space apart from one or a plurality of indented rings or annular bands or channels and at least one or a plurality of markings. The at least one indented ring (358) and at least one marking (360) may be spaced out uniformly or non-uniformly along modified pump neck (364) depending on the fluid dispensing application. Any suitable number or positions of at least one indented ring (358) and/or at least one marking (360) may be used as would be apparent to one of ordinary skill in the art in view of the teachings herein. It will be appreciated that the at least one or a plurality of indented rings, annular channels, annular bands, annular projections, or the like, may have any suitable position and/or configuration.

In the illustrated version, an adapter ring (312) comprises a c-shaped ring shaped to fit around or clip onto at least one indented ring (358). Adapter ring (312) comprises any suitable shape, such as a c-shape or u-shape, that a user can push into at least one indented ring (358) or annular channel. Once engaged with at least one indented ring (358), adapter ring (312) acts as a stop such that as pump head (352) is pressed downward, adapter ring (312) prevents pump head (352) from moving further down once adapter ring (312) comes into contact with bottle collar (322).

A user may determine a particular amount of fluid to dispense corresponding to at least one marking (360). Once selected, the adapter ring (312) is clipped or otherwise engaged with the at least one indented ring (358), which may correspond to at least one marking (360), for the amount desired. Once adapter ring (312) is in place, the user can then press on pump head (352) to dispense the appropriate amount of fluid. If the user desires a different amount, the user can remove adapter ring (312) from at least one indented ring (358) and move adapter ring (312) into a different at least one indented ring (358) until the user finds a satisfactory position for adapter ring (312), which dispenses the appropriate amount of fluid. The at least one marking (360) may include specific fluid amounts or may simply include Arabic numerals indicating different levels of fluid delivery. The adapter ring, clip, or suitable fluid limiting member may be removable from the pump neck or, in one version, may be locked upon engagement.

Figure 14:
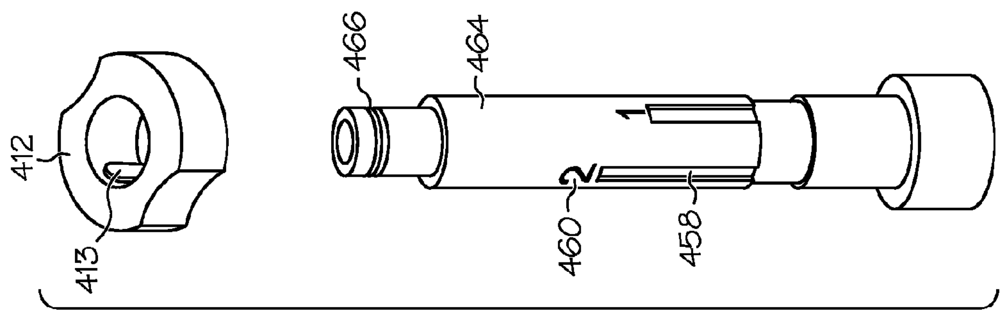
FIG. 14 depicts a perspective view of an adapter ring of the pump bottle adapter and a pump shaft of the modified pump bottle of FIG. 13A.
Figure 13B:
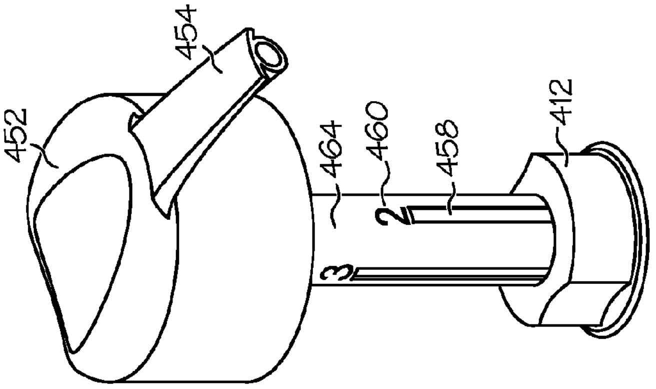
FIG. 13B depicts another perspective view of the pump bottle adapter and the modified pump bottle of FIG. 13A
Figure 13A:
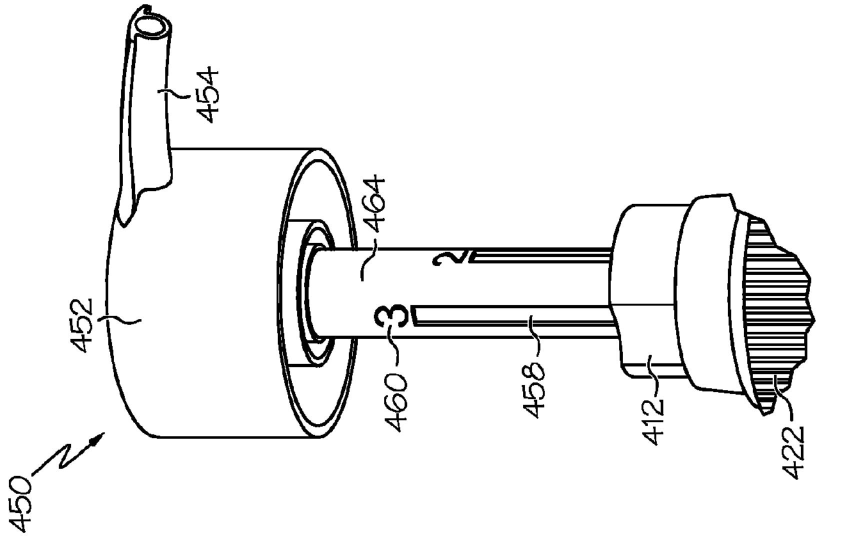
FIG. 13A depicts an alternative version of a pump bottle adapter with a modified pump bottle.
Figure 15A:
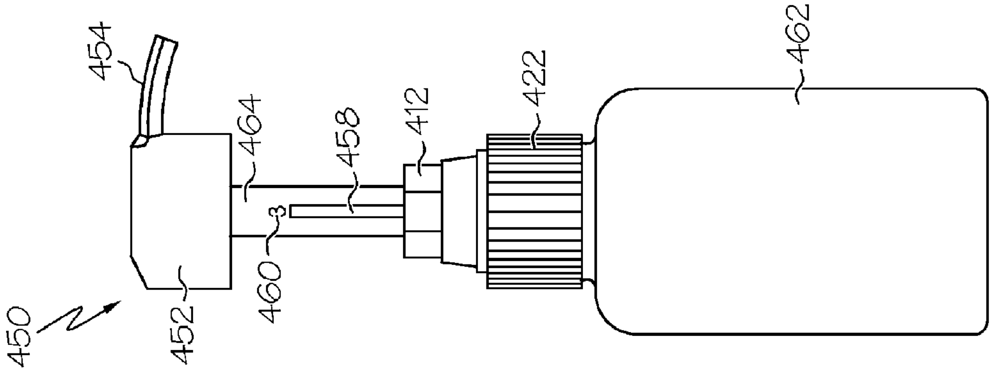
FIG. 15A depicts a side view of the pump bottle adapter and the modified pump bottle of FIG. 13A.
Figure 15B:
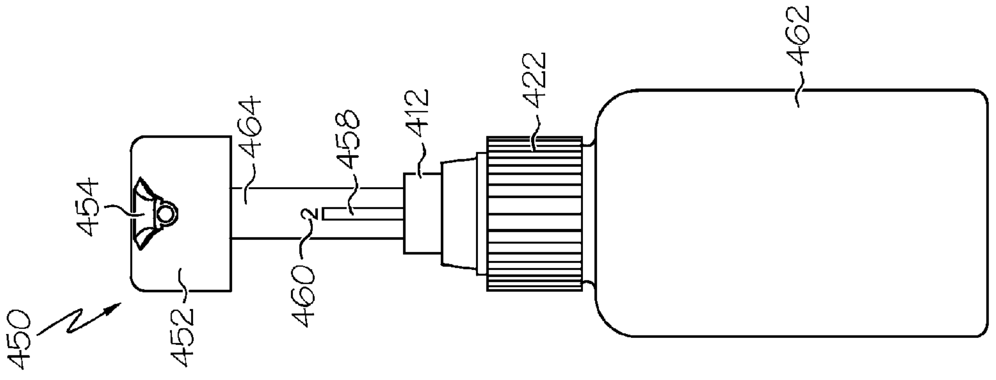
FIG. 15B depicts a front view of the pump bottle adapter and the modified pump bottle of FIG. 13A.

FIGS. 13-15 depict an alternate version of a modified pump bottle (450) having a pump head (452), modified pump neck (464), and an adapter ring (412). Pump head (452) comprises a standard shaped pump head (452) for use with pump bottle (450) operable for a user to press downward to dispense a fluid contained in a bottle portion (462). Pump head (452) comprises a dispensing spout (454) for dispensing a fluid contained in bottle portion (462). Dispensing spout (454) comprises an elongated spout shape, but any suitable means for dispensing fluid may be used as would be apparent to one of ordinary skill in the art in view of the teachings herein.

Modified pump neck (464) connects pump head (452) to bottle collar (422), where bottle collar (422) attaches to bottle portion (462). Modified pump neck (464) comprises a generally cylindrical shape and further comprises at least one vertical indent (458) extending upwards vertically from a bottle collar (422). As illustrated, the modified pump neck (464) may include a plurality of vertical indents having varying configurations.

In one version, corresponding to each of at least one vertical indents (458) is at least one marking (460) for indicating to the user the amount of fluid to be dispensed by modified pump bottle (450). Each of at least one vertical indents (458) has a different height corresponding to a different amount of fluid to be dispensed from pump bottle (450). Prior to dispensing fluid, in one version, the adapter ring (412) is free to revolve around pump neck (464) to properly align the adapter ring (412) with the appropriate at least one vertical indent (458). The at least one vertical indent comprises any suitable vertical track, channel, groove, or the like, configured to accept a stopping tab (413) associated with adapter ring (412).

At the bottom of modified pump neck (464) an adapter ring (412) is positioned against bottle collar (422). In one version, the inner annular surface of adapter ring (412) comprises a stopping tab (413). Stopping tab (413) is oriented vertically such that stopping tab (413) can be aligned with and engaged with each of the at least one vertical indents (458). During use, the adapter ring (412) is rotated about the modified pump neck (464) until the stopping tab (413) is aligned with the desired at least one vertical indent (458). Once aligned, the pump can be depressed such that the stopping tab (413) rides vertically within the at least one vertical indent (458) until the stopping tab (413) engages an abutment at the top of the at least one vertical indent (458). The length of each of the at least one vertical indent (458), as defined by an abutment at the uppermost portion of the channel, limits the downward motion of the modified pump neck (464) such that a limited amount of fluid is dispensed. As illustrated, a plurality of channels may be positioned around the circumference of the modified pump neck (464) having a variety of length associated with a variety of amounts to be dispensed.

The position of stopping tab (413) along adapter ring (412) may be indicated, for example, with an arrow to aid in aligning adapter ring (412) properly. Once adapter ring (412) has been rotated into the appropriate position, the user may press down pump head (452) to dispense a fluid. Stopping tab (413) stops the downward motion of pump neck (464) once stopping tab (413) comes into contact with the upper most portion of at least one vertical indent (458) which corresponds to the fluid amount desired to be dispensed by the user. If the user desires a different fluid amount to be dispensed, the user may rotate adapter ring (412) such that adapter ring (412) corresponds to a different at least one vertical indent (458) and then press down pump head (452) to dispense a different amount. The adapter ring (412) may be configured such that the modified pump neck (464) cannot be depressed until at least one vertical indent (458) is selected. In one version, one of the at least one vertical indents (458) may allow the modified pump neck (464) to maximize the amount of fluid delivered where, for example, such a channel is not associated with an abutment or stopping member.

Figure 17B:
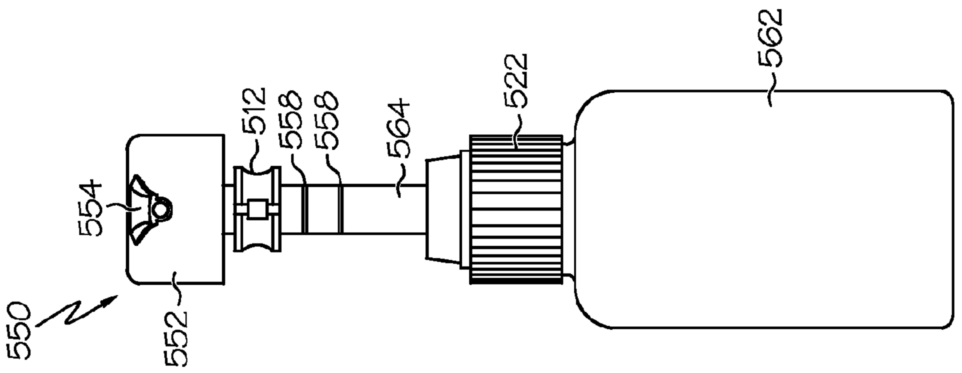
FIG. 17B depicts a front view of the pump bottle adapter with the pump bottle of FIG. 16.
Figure 17A:
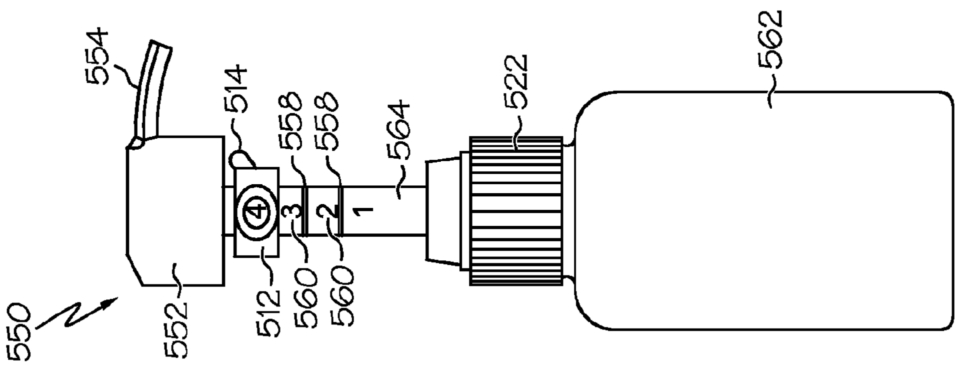
FIG. 17A depicts a side view of the pump bottle adapter and the pump bottle of FIG. 16.
Figure 16:
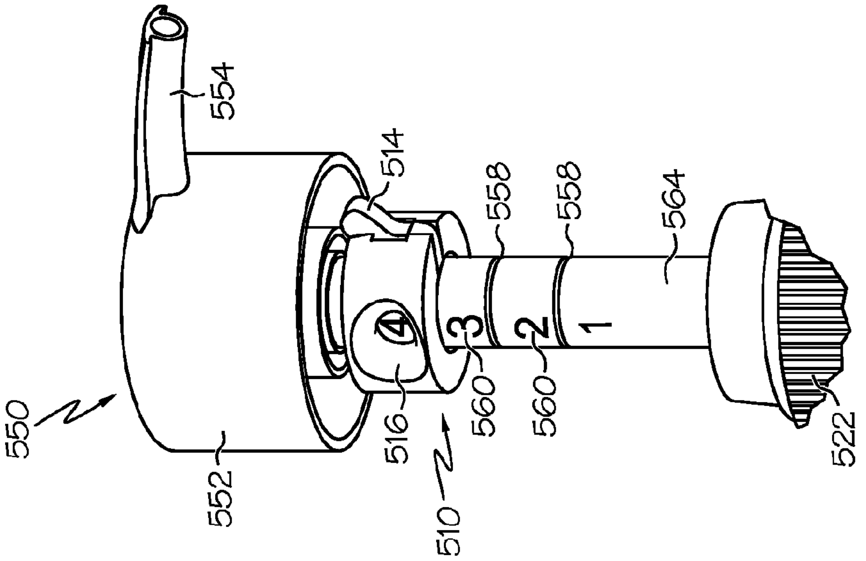
FIG. 16 depicts a perspective view of an alternative version of a pump bottle adapter with a pump bottle.

FIGS. 16-17 depict a version of a modified pump bottle (550) having a pump head (552), modified pump neck (564), and an adapter ring (512). Pump head (552) comprises a standard shaped pump head (552) for use with pump bottle (550) operable for a user to press downward to dispense a fluid contained in a bottle portion (562). Pump head (552) comprises a dispensing spout (554) for dispensing a fluid contained in bottle portion (562). Dispensing spout (554) comprises an elongated spout shape, but any suitable means for dispensing fluid may be used as would be apparent to one of ordinary skill in the art in view of the teachings herein.

Modified pump neck (564) connects pump head (552) to bottle collar (522), where bottle collar (522) attaches to bottle portion (562). Modified pump neck (564) comprises at least one notch (558) along the length of pump neck (564). At least one notch (558) encircles pump neck (564), but may be configured, for example, to encircle only partially around the circumference of pump neck (564). Pump neck (564) further comprises at least one marking (560), where at least one marking (560) corresponds to at least one notch (558), indentation, groove, annular indentation, or the like.

Adapter ring (512) is positioned around pump neck (564). Adapter ring (512) comprises a locking tab (514) and adapter opening (516). Locking tab (514) is able to engage at least one notch (558) such that adapter ring (512) is coupled to at least one notch (558) being engaged by locking tab (514). When locking tab (514) is engaged with at least one notch (558), adapter ring (512) is not able to move along pump neck (564). Locking tab (514) may be pressed inward by the user against pump neck (564) to disengage locking tab (514) from at least one notch (558). Once locking tab (514) is disengaged from at least one notch (558) adapter ring (512) may be moved along pump neck (564) until locking tab (514) engages another at least one notch (558). Adapter opening (516) in conjunction with at least one marking (560) may be used to determine a proper positioning of adapter ring (512).

Thus, in one exemplary use, the user may hold locking tab (514) of adapter ring (512) to disengage locking tab (514) from any of at least one notch (558). User may move adapter ring (512) along pump neck (564) to an appropriate position by generally aligning at least one marking (560) with adapter opening (516). Upon determining that adapter ring (512) is in an appropriate position, the user may release locking tab (514) such that locking tab (514) engages at least one notch (558). The user may then press downward on pump head (552), which then dispenses fluid from dispensing spout (554). Pump head (552) may only travel downward until adapter ring (512) comes into contact with bottle collar (522). If the user desires to dispense a different liquid amount, then the user may press locking tab (514) to disengage locking tab (514) from at least one notch (558) and move adapter ring (512) to a different position. As illustrated, any suitable adapter ring may be associated with any suitable locking mechanism, markings, and/or modifications to a pump neck.

Figure 18:
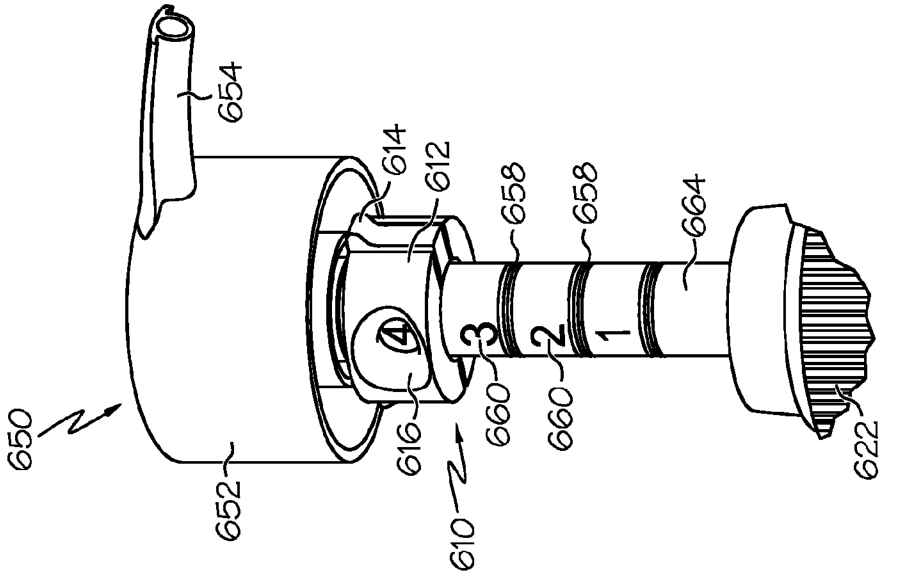
FIG. 18 depicts a perspective view of an alternative version of a pump bottle adapter with a pump bottle.
Figure 19A:
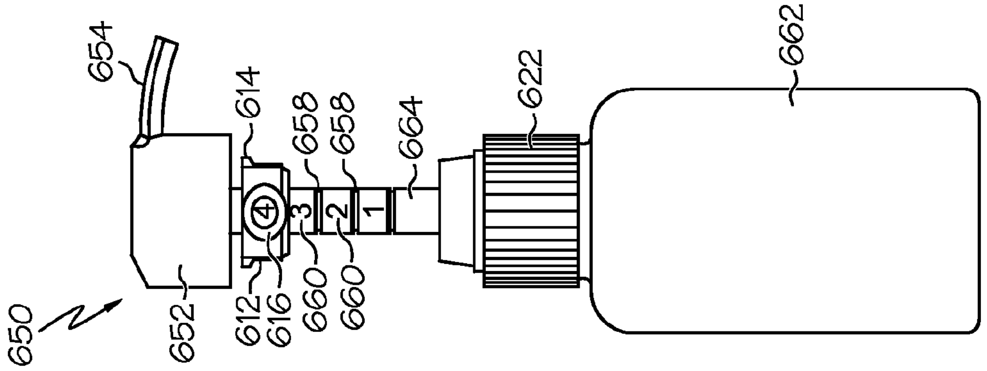
FIG. 19A depicts a side view of the pump bottle adapter with the pump bottle of FIG. 18.
Figure 19B:
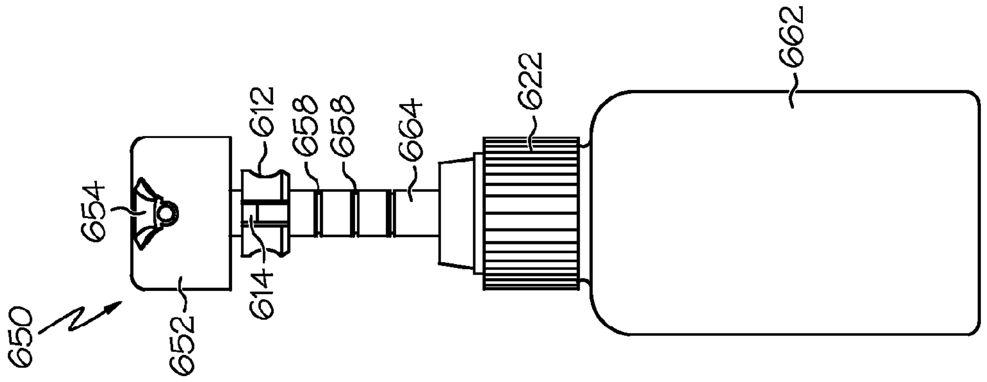
FIG. 19B depicts a front view of the pump bottle adapter with the pump bottle of FIG. 18.

FIGS. 18-19 depict a version of a modified pump bottle (650) having a pump head (652), modified pump neck (664), and an adapter ring (612). Pump head (652) comprises a standard shaped pump head (652) for use with pump bottle (650) operable for a user to press downward to dispense a fluid contained in a bottle portion (662). Pump head (652) comprises a dispensing spout (654) for dispensing a fluid contained in bottle portion (662). Dispensing spout (654) comprises an elongated spout shape, but any suitable means for dispensing fluid may be used as would be apparent to one of ordinary skill in the art in view of the teachings herein.

Modified pump neck (664) connects from pump head (652) to bottle collar (622), where bottle collar (622) attaches to bottle portion (662). Modified pump neck (664) comprises at least one notch (658) along the length of pump neck (664). At least one notch (658) encircles pump neck (664), but may be configured to encircle only partially around the circumference of pump neck (664). Pump neck (664) further comprises at least one marking (660), where at least one marking (660) corresponds to at least one notch (658).

Adapter ring (612) is positioned around pump neck (664). Adapter ring (612) comprises a pair of locking tabs (614) and adapter opening (616). Pair of locking tabs (614) are able to engage at least one notch (658) such that adapter ring (612) is coupled to at least one notch (658) being engaged by pair of locking tabs (614). When pair of locking tabs (614) is engaged with at least one notch (658), adapter ring (612) is not able to move along pump neck (664). Pair of locking tabs (614) may be pressed inward by the user against pump neck (664) to disengage pair of locking tabs (614) from at least one notch (658). Once pair of locking tabs (614) is disengaged from at least one notch (658) adapter ring (612) may be moved along pump neck (664) until pair of locking tabs (614) engages another at least one notch (658). Adapter opening (616) in conjunction with at least one marking (660) may be used to determine a proper positioning of adapter ring (612).

Thus, in one exemplary use, the user may hold pair of locking tabs (614) of adapter ring (612) to disengage pair of locking tabs (614) from any of at least one notch (658). User may move adapter ring (612) along pump neck (664) to an appropriate position by generally aligning at least one marking (660) with adapter opening (616). Upon determining that adapter ring (612) is in an appropriate position, the user may release pair of locking tabs (614) such that pair of locking tabs (614) engages at least one notch (658). The user may then press downward on pump head (652), which then dispenses fluid from dispensing spout (654). Pump head (652) may only travel downward until adapter ring (612) comes into contact with bottle collar (622). If the user desires to dispense a different liquid amount, then the user may press pair of locking tabs (614) to disengage pair of locking tabs (614) from at least one notch (658) and move adapter ring (612) to a different position.

Figure 21B:
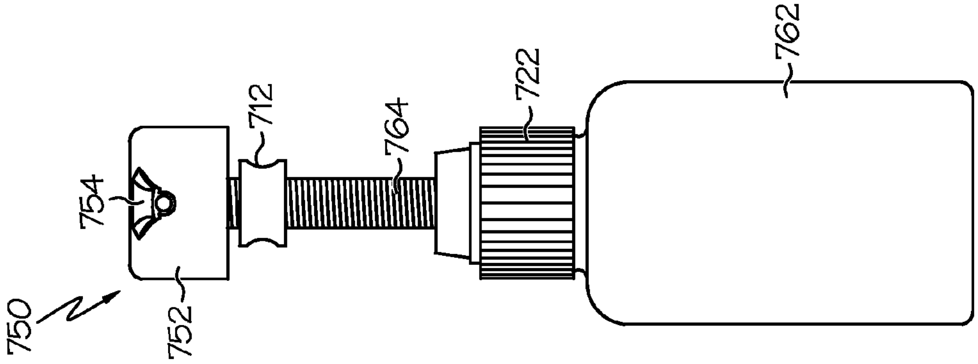
FIG. 21B depicts a front view of the pump bottle adapter with the pump bottle of FIG. 20.
Figure 21A:
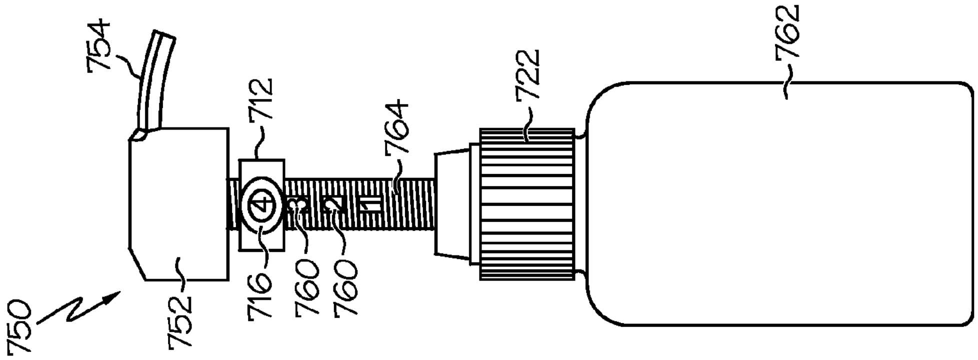
FIG. 21A depicts a side view of the pump bottle adapter with the pump bottle of FIG. 20.
Figure 20:
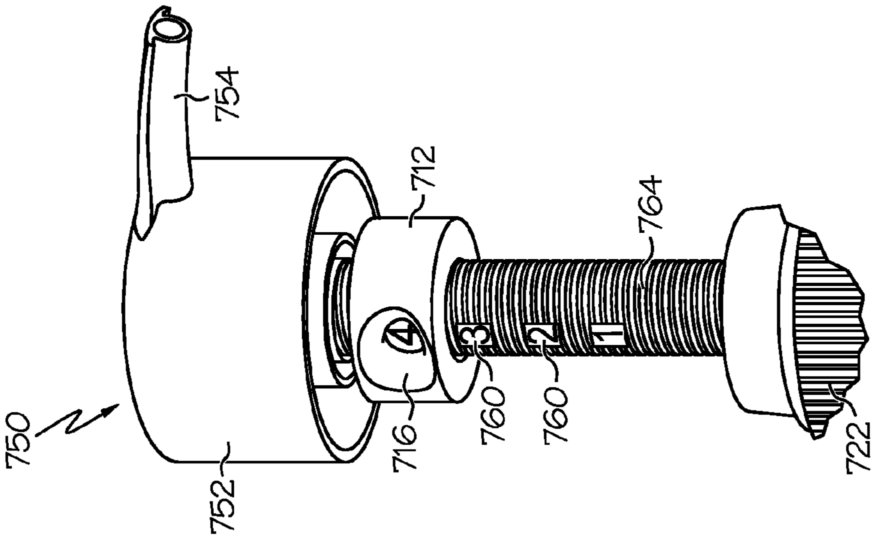
FIG. 20 depicts a perspective view of an alternative version of a pump bottle adapter with a pump bottle.

FIGS. 20-21 depict a version of a modified pump bottle (750) having a pump head (752), modified pump neck (764), and an adapter ring (712). Pump head (752) comprises a standard shaped pump head (752) for use with pump bottle (750) operable for a user to press downward to dispense a fluid contained in a bottle portion (762). Pump head (752) comprises a dispensing spout (754) for dispensing a fluid contained in bottle portion (762). Dispensing spout (754) comprises an elongated spout shape, but any suitable means for dispensing fluid may be used as would be apparent to one of ordinary skill in the art in view of the teachings herein.

Modified pump neck (764) connects pump head (752) to bottle collar (722), where bottle collar (722) attaches to bottle portion (762). Pump neck (764) comprises a threaded shaft. In the illustrated version, threading of pump neck (764) may extend along the entire length of pump neck (764) or threading may extend only along a portion of pump neck (764).

Adapter ring (712) comprises an adapter opening (716). Adapter ring (712) further comprises a set of threads complementary to threads running along pump neck (764). Adapter ring (712) may be rotated around pump neck (764) to move adapter ring (712) up and down along pump neck (764). Rotating adapter ring (712) in a first direction may move up adapter ring (712) along pump neck (764) whereas rotating adapter ring (712) in a second direction may move down adapter ring (712) along pump neck (764).

The user, for example, may move adapter ring (712) up and down pump neck (764) by rotating adapter ring (712) until adapter ring (712) is at a suitable position for dispensing a desirable amount of fluid. Once adapter ring (712) is in an appropriate position along pump neck (764), pump head (752) may be pressed down until adapter ring (712) contacts bottle collar (722) thereby dispensing an amount of fluid. If the user determines that a different amount of fluid is desired, then the user may adjust the position of adapter ring (712) along pump neck (764) by rotating adapter ring (712) to move adapter ring (712) along pump neck.

It will be appreciated that versions of the adapter described herein are configured to limit the stroke of the pump neck such that, if desirable, a predetermined amount of fluid associated with a stroke less than that of a full or maximum stroke may be provided on a predictable and continuous basis. Providing a limited stroke with predictable results may allow for fluids such as medication, vitamins, syrups, chemicals, detergents, cleaning solutions, food products, sanitizers, alcohol, spirits, or any other desirable fluid. Providing one or a plurality of limited strokes may help provide accurate results for products such as medications and may limit unnecessary product loss associated with dispensing fluids such as spirits.

In summary, numerous benefits have been described which result from employing the concepts of the invention. The foregoing description of one or more embodiments of the invention has been presented for purposes of illustration and description. It is not intended to be exhaustive or to limit the invention to the precise form disclosed. Obvious modifications or variations are possible in light of the above teachings. The one or more embodiments were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A dispensing apparatus comprising:

(a) a pump bottle, the pump bottle comprising;
 (i) a fluid retaining portion;
 (ii) a pump neck, the pump neck having a first central axis, a bottom portion, and a top portion, wherein the bottom portion is engaged with the fluid retaining portion of the pump bottle such that the pump neck is in fluid communication with the fluid retaining portion; and
 (iii) a pump head, the pump head being associated with the top portion of the pump neck, wherein the pump head is configured to dispense a fluid retained in the fluid retaining portion of the pump bottle;

(b) an adapter ring, the adapter ring being engaged with the pump neck, wherein the adapter ring is selectively moveable along a vertical length of the pump neck along the first central axis;

(c) a locking member, the locking member including a pivot portion having a second central axis offset from the first central axis, a handle being operable for manipulation by a user, and a tab, wherein the locking member is associated with the adapter ring;

(d) a first unlocked position, wherein the adapter ring in the first unlocked position is free to travel along the vertical length of the pump neck and the handle of the locking member is in a first handle position; and (e) a second locked position, wherein the handle of the locking member is in a second handle position and the tab is engaged with the pump neck such that the adapter ring is fixed along the vertical length of the pump neck.

2. The apparatus of claim 1, wherein the pump neck comprises a plurality of markings, the plurality of markings corresponding to selectable limited strokes of the pump neck.

3. The apparatus of claim 1, wherein the adapter ring further comprises an adapter opening.

4. The apparatus of claim 3, wherein the adapter opening is operable to be positioned in line with a marking, the marking being configured to correspond to an amount of fluid to be dispensed by the pump bottle.

5. The apparatus of claim 1, wherein the adapter ring comprises a rectangular slot, the rectangular slot being shaped such that the locking member fits through the rectangular slot.

6. The apparatus of claim 5, wherein the rectangular slot further comprises a notch, wherein the notch is configured to complement the shape of the locking member such that the locking member can fit in only one direction within the rectangular slot.

7. The apparatus of claim 1, wherein the locking member comprises a tab, the tab being operable to facilitate engagement with the pump neck.

8. The apparatus of claim 1, wherein the locking member engages the pump neck with a friction fit.

9. The apparatus of claim 1, wherein the adapter ring is configured to selectively provide a plurality of limited strokes.

10. The apparatus of claim 1, wherein the locking member comprise at least one projection that engages at least one indentation on the pump neck.

* * * * *